(12) United States Patent
Van Noland et al.

(10) Patent No.: US 7,918,732 B2
(45) Date of Patent: Apr. 5, 2011

(54) MANIFOLD COMPATIBILITY ELECTRONIC OMNI AXIS HUMAN INTERFACE

(76) Inventors: Milton Charles Van Noland, Grass Valley, CA (US); Joy Lucette Garner, Grass Valley, CA (US)

( * ) Notice: Subject to any disclaimer, the term of this patent is extended or adjusted under 35 U.S.C. 154(b) by 476 days.

(21) Appl. No.: 11/377,999

(22) Filed: Mar. 17, 2006

(65) Prior Publication Data

US 2006/0252543 A1 Nov. 9, 2006

Related U.S. Application Data

(60) Provisional application No. 60/678,435, filed on May 6, 2005.

(51) Int. Cl.
*A63F 9/00* (2006.01)
(52) U.S. Cl. .......................................................... 463/37
(58) Field of Classification Search .............. 463/36–73; 482/8, 45
See application file for complete search history.

(56) References Cited

U.S. PATENT DOCUMENTS

| | | | |
|---|---|---|---|
| 4,512,567 A | 4/1985 | Phillips | |
| 4,630,817 A | 12/1986 | Buckley | |
| 4,711,447 A | 12/1987 | Mansfield | |
| 5,076,584 A | 12/1991 | Openiano | |
| 5,120,228 A | 6/1992 | Stahl et al. | |
| 5,240,417 A | 8/1993 | Smithson et al. | |
| 5,272,932 A * | 12/1993 | Koyamatsu et al. | ............ 74/492 |
| 5,462,503 A | 10/1995 | Benjamin et al. | |
| 5,466,200 A | 11/1995 | Ulrich et al. | |
| 5,562,572 A | 10/1996 | Carmein | |
| 5,577,981 A * | 11/1996 | Jarvik | ................................ 482/4 |
| 5,591,104 A * | 1/1997 | Andrus et al. | ..................... 482/7 |
| 5,645,513 A | 7/1997 | Haydocy et al. | |
| 5,667,459 A | 9/1997 | Su | |
| 5,749,577 A * | 5/1998 | Couch et al. | ............... 273/148 B |
| 5,785,630 A * | 7/1998 | Bobick et al. | ..................... 482/4 |
| 5,839,990 A * | 11/1998 | Virkkala | ............................ 482/8 |
| 5,890,995 A | 4/1999 | Bobick et al. | |
| 6,244,988 B1 | 6/2001 | Delman | |
| 6,283,896 B1 | 9/2001 | Grunfeld et al. | |
| 6,626,799 B2 | 9/2003 | Watterson et al. | |
| 6,918,860 B1 * | 7/2005 | Nusbaum | ........................ 482/57 |
| 2003/0171190 A1 * | 9/2003 | Rice | ................................ 482/57 |

* cited by examiner

*Primary Examiner* — Melba Bumgarner
*Assistant Examiner* — Seng Heng Lim

(57) ABSTRACT

A manifold compatibility omni axis, electronic human interface device comprises a controller operatively coupled to an omni axis steering device having one or more attachments for motion detection, and a stationary fitness device operatively coupled to the controller. The controller comprises a re-centerer for re-centering one or more axis of movement, and a ratio processor for interpreting, transmitting, and adjusting one or more ratios for speed and other axis of movement. The controller is operatively coupled to a computer via a standard interface. The computer is configured to play a virtual reality program based at least in part on input from the controller. The controller is configured to mimic natural steering movements, making a user's physical movements with respect to the omni axis steering device and the stationary fitness device closely resemble movements in the virtual reality program.

1 Claim, 7 Drawing Sheets

MANIFOLD COMPATIBILITY ELECTRONIC OMNI AXIS HUMAN INTERFACE

CROSS REFERENCE TO RELATED APPLICATIONS

This application claims the benefit of provisional patent application No. 60/678,435 filed May 6, 2005, entitled "Manifold Compatibility Electronic Omni Axis Human Interface".

FIELD OF THE INVENTION

The present invention relates to the field of computer science. More particularly, the present invention relates to a manifold compatibility electronic omni axis human interface.

BACKGROUND OF THE INVENTION

Many attempts have been made to increase the entertainment value of computer games and training systems. An area of extreme interest, both for designers and users of these systems, is that of physical immersion into a computer-generated world. A desire to have the sensation of truly being "in the game" has brought about the term "virtual reality". The expression of this desire has been heavily pursued in both the entertainment and training industries. Examples are seen in the creation of sensors in hand or body gloves and helmets, infrared or other motion detecting devices, sensory replication devices, voice recognition and command, and display eyeglasses or goggles.

Some solutions purport to be able to (1) detect the movement of a user, (2) provide feedback information to the user, and (3) be adapted to other computer gaming or training systems. But these solutions typically either fail to disclose a means for accomplishing these goals, or describe various functions and feedback that are incompatible with existing systems currently in wide use. In some solutions, the complexity of the information to be computed is increased to such an extent that there is no practical application without specialized computers and specifically designed programs. For example, one solution attempts to replicate the exact movements and leaning of a real bike ride. As the bike leans however, it is not clear how the centrifugal forces of real riding are replicated in such a way as to keep a user from falling off of the bike in a deep turn. This solution requires the use of force-feedback information, which requires specialized programming and processors.

Some solutions display a number of possible configurations as a means for arranging components that create a desired outcome, but fail to specify the mechanical or electronic inner workings of the device. Some solutions suggest that signals could be transmitted via analog means. However, an analog transmission provides imprecise movement along various axis within computer software commonly in use today. Some solutions mention digital transmission but fail to disclose a means for interfacing between the mechanical and electronic mechanisms comprising the computer gaming or training systems.

Some solutions require a separate computer and monitor in addition to whatever computer and user monitor a user already possesses, thus failing to leverage existing computer resources and making the solution prohibitively expensive.

Some solutions feature interfacing optical beams interruptible by the movements of a user's feet, but fail to disclose a means for transmitting this information into a readable signal for the gaming or training device.

One solution features a common joystick normally interfaced with a computer. A braking effect occurs within a game when interfaced with an exercise bicycle that is being pedaled too slowly. But this solution requires a minimum speed to be maintained in order to move within the game at all.

Other solutions are limited in its scope of various axis movements through a 3-D world. Still other solutions disclose various non-intuitive means, such as switches, for turning and moving up and down.

One solution features a configuration for setting a laptop on a shelf attached to a treadmill, which is outfitted with a roller, to detect motion on the treadmill and integrated buttons. But this design limits the user to a button pushing means of other axis movement and turning through the game, with the exception of the forward movement.

Other solutions relate to programmed control of gaming or training equipment, rather than the equipment controlling a gaming or training program.

The technical limitations and commercial applications of the various devices intended to increase physical involvement in a computer-generated world have been widely varied. Commercial success with such devices often requires additional advances in computing power in order to handle all of the information provided by these devices. Without the computing power to support them, use of these devices creates a perceptible delay between what is acted out by the user, and the feedback the user receives. When the delay is perceptible, the original purpose of the virtual reality is defeated. The more complex the information being received and fed back to the user, the longer the delay, and the more powerful and advanced the computers system requirements, in order to overcome the problem. Presently, there are many gaming and training systems that function with widely used home computers, with relatively little delay time. However, these tend to have a limited benefit in terms of physical involvement, as they depend primarily upon small hand movements such as button pushing.

Accordingly, a need exists in the art for an improved user interface for computer applications such as gaming, training, and other applications, that is compatible with widely used computer systems and programs. A further need exists for such a solution that increases the physical involvement or expression of the user in the computer application, while maintaining the complexity of the information to be processed by the computer and simplifying the operation for the user, thus creating a more intuitive physical action for the user in the user's interactions with a game, training system or other application.

SUMMARY OF THE INVENTION

A manifold compatibility omni axis, electronic human interface device comprises a controller operatively coupled to an omni axis steering device having one or more attachments for motion detection, and a stationary fitness device operatively coupled to the controller. The controller comprises a re-centerer for re-centering one or more axis of movement, and a ratio processor for interpreting, transmitting, and adjusting one or more ratios for speed and other axis of movement. The controller is operatively coupled to a computer via a standard interface. The computer is configured to play a virtual reality program based at least in part on input from the controller. The controller is configured to mimic natural steering movements, making a user's physical movements with respect to the omni axis steering device and the stationary fitness device closely resemble movements in the virtual reality program.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1:
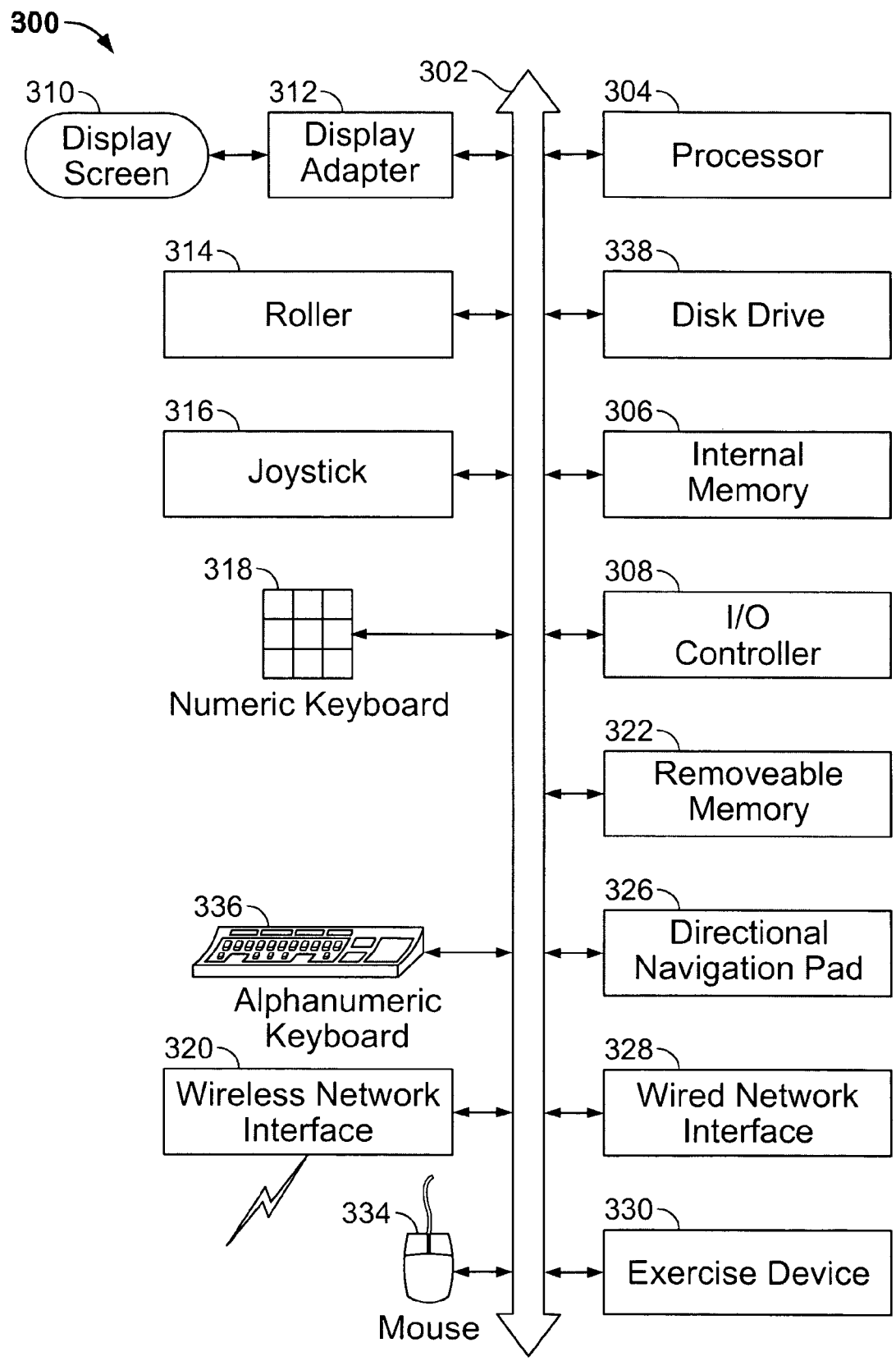
FIG. 1 is a block diagram of a computer system suitable for implementing aspects of the present invention.

Embodiments of the present invention are described herein in the context of a manifold compatibility electronic omni axis human interface. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

According to one embodiment of the present invention, the components, process steps, structures, or any combination thereof, may be implemented using various types of operating systems (OS), computing platforms, firmware, computer programs, computer languages, general-purpose machines, or any combination thereof. The method can be run as a programmed process running on processing circuitry. The processing circuitry can take the form of one or more combinations of processors and operating systems, connections and networks, data stores, or a stand-alone device. The process can be implemented as instructions executed by such hardware, hardware alone, or any combination thereof. The software may be stored on a program storage device readable by a machine.

According to one embodiment of the present invention, the components, processes data structures, or any combination thereof, may be implemented using machine language, assembler, C or C++, Java, other high level language programs running on computers (such as running windows XP, XP PRO, CE, 2000K (other windows), Linux or Unix, Solaris, Palm, or Apple OS X based systems), or any combination thereof. According to one embodiment of the present invention, the processes may be implemented using a distributed component management and run-time deployment tool such as MOJO, by Object Forge, LTD of the United Kingdom. Different implementations may be used and may include other types of operating systems, computing platforms, computer programs, firmware, computer languages, general-purpose machines, or any combination thereof. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

According to one embodiment of the present invention, the method may be implemented on a data processing computer such as a personal computer, workstation computer, mainframe computer, or high performance server running an OS such as Solaris® available from Sun Microsystems, Inc. of Santa Clara, Calif., Microsoft® Windows® XP and Windows® 2000, available from Microsoft Corporation of Redmond, Wash., or various versions of the Unix operating system such as Linux available from a number of vendors. The method may also be implemented on a mobile device running an OS such as Windows® CE, available from Microsoft Corporation of Redmond, Wash., Symbian OS™, available from Symbian Ltd of London, UK, Palm OS®, available from PalmSource, Inc. of Sunnyvale, Calif., and various embedded Linux operating systems. Embedded Linux operating systems are available from vendors including MontaVista Software, Inc. of Sunnyvale, Calif., and FSMLabs, Inc. of Socorro, N.M. The method may also be implemented on a multiple-processor system, or in a computing environment including various peripherals such as input devices, output devices, displays, digital cameras, mobile phones, digital video cameras, mobile computing devices, pointing devices, memories, storage devices, media interfaces for transferring data to and from the processor(s), and the like. In addition, such a computer system or computing environment may be networked locally, or over the Internet or other networks.

In the context of the present invention, the term "connection means" includes any means by which a first one or more devices communicate with a second one or more devices. In more detail, a connection means includes networks and direct connection mechanisms, parallel data busses, and serial data busses.

In the context of the present invention, the term "network" includes local area networks, wide area networks, metro area networks, residential networks, personal area networks, corporate networks, inter-networks, the Internet, the World Wide Web, ad-hoc networks, peer-to-peer networks, server networks, backbone networks, cable television systems, telephone systems, wireless telecommunications systems, WiFi networks, Bluetooth networks, SMS networks, MMS networks, fiber optic networks, token ring networks, Ethernet networks, ATM networks, frame relay networks, satellite communications systems, and the like. Such networks are well known in the art and consequently are not further described here.

In the context of the present invention, the term "processor" describes a physical computer (either stand-alone or distributed) or a virtual machine (either stand-alone or distributed) that processes or transforms data. The processor may be implemented in hardware, software, firmware, or a combination thereof.

In the context of the present invention, the term "data stores" describes a hardware means or apparatus, a software means or apparatus, or a hardware and software means or apparatus, either local or distributed, for storing digital or analog information or data. The term "Data store" describes, by way of example, any such devices as random access memory (RAM), read-only memory (ROM), dynamic random access memory (DRAM), static dynamic random access memory (SDRAM), Flash memory, hard drives, disk drives, RAID storage, floppy drives, tape drives, CD drives, DVD drives, magnetic tape devices (audio, visual, analog, digital, or a combination thereof), optical storage devices, electrically erasable programmable read-only memory (EEPROM), solid state memory devices and Universal Serial Bus (USB) storage devices, and the like. The term "Data store" also describes, by way of example, databases, file systems, record systems, object oriented databases, relational databases, multidimensional databases, SQL databases, audit trails and logs, program memory, cache and buffers, and the like.

In the context of the present invention, the term "user interface" describes any device or group of devices for presenting information to or from persons or animals, receiving information to or from persons or animals, or both. A user interface may comprise a means to present information to persons or animals, such as a visual display projector or screen, a loudspeaker, a light or system of lights, a printer, a Braille device, a vibrating device, or the like. A user interface may also include a means to receive information or directions from persons or animals, such as one or more or combinations of buttons, keys, levers, switches, knobs, touch pads, touch screens, microphones, speech detectors, motion detectors, cameras, and light detectors. Exemplary user interfaces comprise pagers, mobile phones, desktop computers, laptop computers, handheld and palm computers, personal digital assistants (PDAs), cathode-ray tubes (CRTs), keyboards, keypads, liquid crystal displays (LCDs), control panels, horns, sirens, alarms, printers, speakers, mouse devices, consoles, and speech recognition devices.

In the context of the present invention, the term "sensor" describes any device adapted to sense at least one change or differential in a physical environment or object. Sensors may be visual sensors or non-visual sensors. Exemplary visual sensors comprise color cameras and infrared cameras. Such cameras may be video cameras, still cameras, or both. Such cameras may also be analog cameras, digital cameras, or both. Non-visual sensors comprise sensors for detecting non-visual aspects of an event. Exemplary non-visual passive sensors comprise magnetic sensors, heat sensors, sound sensors, microphones, vibration sensors, motion detectors, radiation detectors, and the like. Exemplary non-visual active sensors comprise RFID readers, smart card readers, transponder devices, and other card and device readers.

In the context of the present invention, the term "standard interface" refers to a de facto or de jure protocol for communitively coupling two or more components of a computer system. A standard interface includes, by way of example, a USB interface. A standard interface also includes, by way of example, a PS/2 interface. A standard interface also includes, by way of example, an RS-232C (Recommended Standard 232C) interface.

Embodiments of the current invention maintain the complexity of the information to be processed by the computer, while increasing the user's physical involvement in a gaming or training system. Embodiments of the current invention rely upon an intuitive set of movements by the user, and the user therefore requires a relatively small learning curve in order to enjoy its benefits. Embodiments of the present invention are compatible with computer gaming and training systems that are currently in wide use.

FIG. 1 depicts a block diagram of a computer system 300 suitable for implementing aspects of the present invention. As shown in FIG. 1, computer system 300 comprises a bus 302 which interconnects major subsystems such as a central processor 304, a system memory 306 (typically RAM), an input/output (I/O) controller 308, an external device such as a display screen 310 via display adapter 312, a roller 314, a joystick 316, a keyboard 336, and a disk drive 338 operative to receive a disk recording medium. Many other devices can be connected, such as a wireless network interface 320 and an exercise device 330. Wireless network interface 332 may provide a direct connection to a remote server via a wireless link or to the Internet via a POP (point of presence). Alternatively, a network interface adapter 334 may be used to interface to a local or wide area network using any network interface system known to those skilled in the art (e.g., Ethernet, xDSL, AppleTalk™).

Many other devices or subsystems (not shown) may be connected in a similar manner. Also, it is not necessary for all of the devices shown in FIG. 1 to be present to practice the present invention, as discussed below. Furthermore, the devices and subsystems may be interconnected in different ways from that shown in FIG. 1. The operation of a computer system such as that shown in FIG. 1 is readily known in the art and is not discussed in detail in this application, so as not to overcomplicate the present discussion. Code to implement the present invention may be operably disposed in system memory 306 or stored on storage media such as a fixed disk, or removable memory such as a floppy disk, CD-ROM, or memory stick.

Figure 2:
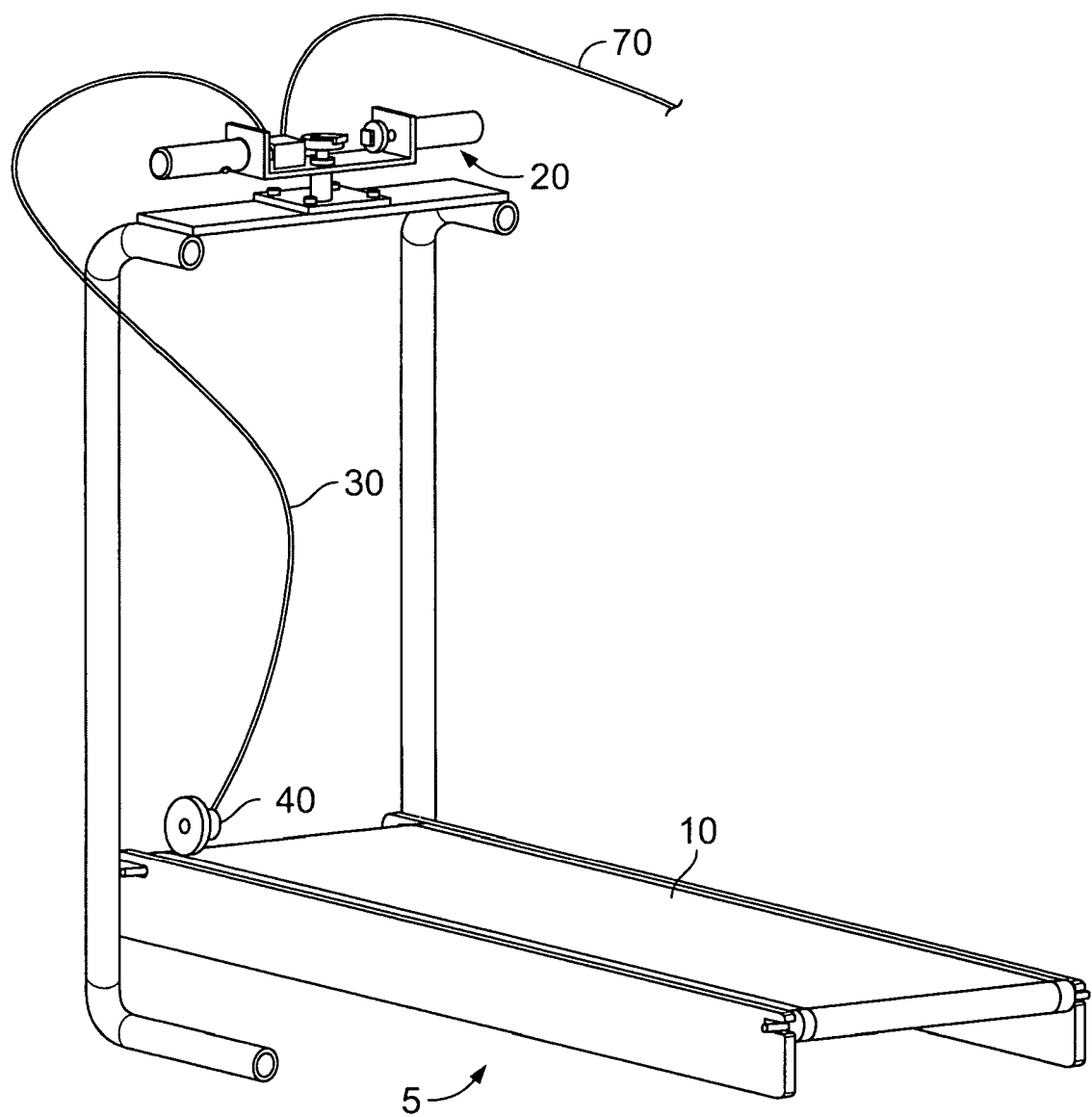
FIG. 2 is a view from the left-rear of a controller mounted on an exercise machine in accordance with one embodiment of the present invention.

Turning now to FIG. 2, a view from the left-rear of a controller mounted on an exercise machine in accordance with one embodiment of the present invention is presented. As shown in FIG. 2, reference numeral 5 indicates a controller mounted to an exercise apparatus 10. As shown in FIG. 2, exercise apparatus 10 comprises a user-propelled treadmill. According to one embodiment of the present invention, an encoder assembly 40 tracks movement. Encoder assembly 40 may be secured to exercise apparatus 10 in any manner that will cause encoder assembly 40 to maintain contact with a user-propelled component at all times, or to otherwise detect its movement. Connection means 30 carries the encoder signal. The signal sent from the encoder 40 may also be transmitted wirelessly or through fiber optics (not shown in FIG. 2). According to one embodiment of the present invention, controller 20 is constructed of a material (not shown in FIG. 2) sufficiently rigid to support the weight of the steering and control console, a human body (not shown in FIG. 2) and the potential impact of that body during the gripping and impact of changing directions during movement through a computer gaming or training program, and can also include any number of standard height adjustments. Treadmill 10 may be replaced with various stationary exercise systems and integrate them according to their perspective designs. Connection means 70 connects the controller 20 via a standard interface to a computer or gaming console system (not shown in FIG. 2).

Figure 3:
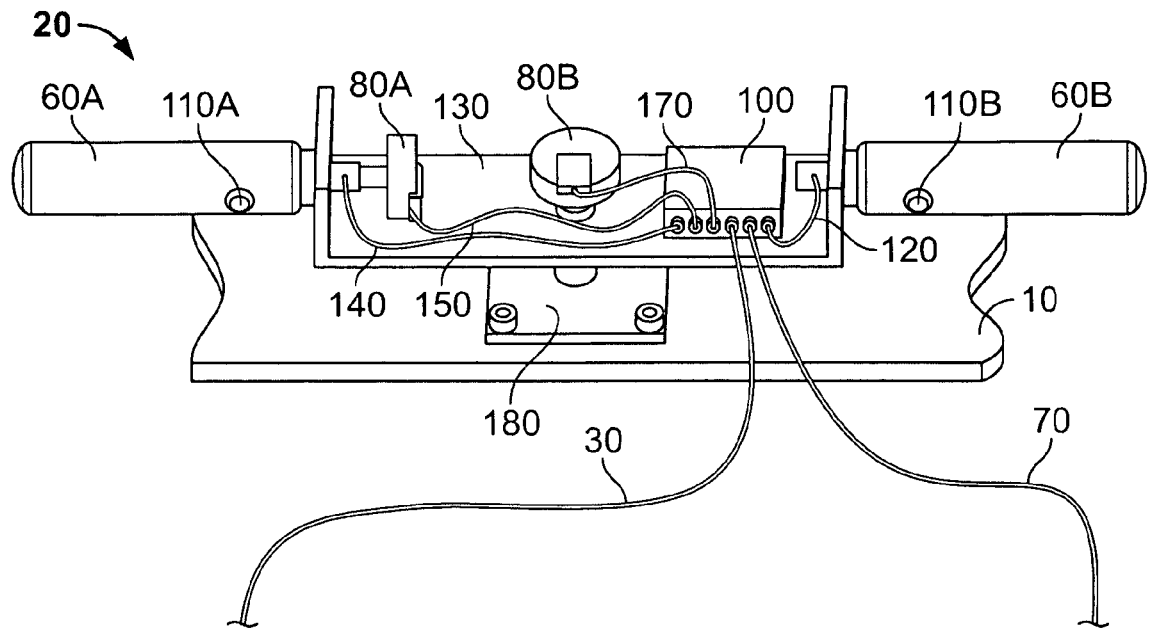
FIG. 3 is an elevated front view of a controller in accordance with one embodiment of the present invention.

Turning now to FIG. 3, an elevated front view of a controller in accordance with one embodiment of the present invention is presented. The steering mount 180 can be manufactured with any material sufficiently rigid to withstand the forces of a human body in motion during the operation of embodiments of the present invention. The steering mount 180 can be attached to the exercise machine 10, as depicted with one or more bolts, or brackets, braces, welds, or other means (not shown in FIG. 3) sufficient to support the user (not shown in FIG. 3) while gripping, turning, running, and sudden stops. The X-axis rotary encoder 80b shaft is inserted through the steering base 130 to attach to the steering mount 180, and can be reinforced to support the vigorous movements of the user, while allowing freedom of steering by means of couplings, bearings, or other device (not shown in FIG. 3) meant for such use. Other means of attaching the steering mount to the encoder shaft include, by way of example, gears, timing pulleys and belts, or chains and sprockets, or the like (not shown in FIG. 3). The right handle 60a and the left handle 60b of the controller 20 can be attached to the steering base 130 with one or more bolts, brackets, welds, or other means (not shown in FIG. 3) sufficient to support the user while running, turning, gripping, etc. Right handle 60a is mounted to steering base 130 with a bearing (not shown in FIG. 3) so that it can rotate the Z-axis encoder 80a shaft, making it possible for the user (not shown in FIG. 3) to look up and down in a computer gaming or training program (not shown in FIG. 3). Other means of attaching the handle 60a to the encoder 80a shaft may include, by way of example, gears, timing pulleys and belts, chains and sprockets, or the like (not shown in FIG. 3). Reference numerals 110a and 110b illustrate possible placements for various triggers or buttons with which the user controls one or more actions within a video game. Handles 60a and 60b as well as the steering base 130 are possible locations for other control buttons. The Z-axis rotary encoder 80a reads the Z-axis movements of the user through the game. The encoder shaft (not shown in FIG. 3) of Z-axis rotary encoder 80a can be attached to handle 60a, handle 60b, or both. Other possibilities for a Z-axis rotary encoder location include a button control interface on either handle 60a or handle 60b, a button control interface attached to any part of steering base 130, or integrated into the steering mount itself in the form of a pivot. The X-axis rotary encoder connection 170 transmits the signal from X-axis rotary encoder 80b shaft to controller 100. Connection means 140 connects the various triggers and/or buttons located on handle 60a to controller 100. Connection means 120 connects any buttons/triggers from handle 60b to controller 100 as well. Z-axis rotary encoder connection 150 transmits the user's Z-axis movements to the controller 100. Additional control buttons, switches or knobs may be used as a means for adjusting the ratio of movement detected. Note: many existing training and gaming programs have within their programs, ratio and signal sensitivity adjustments that are accessible to the user through on-screen menus. Connection means 70 comprises a standard interface operable to connect the controller to an external computer or gaming device. According to one embodiment of the present invention, Z-axis rotary encoder 80a, X-axis rotary encoder 80b, and Y-axis rotary encoder 80c are quadrature encoders, which can be purchased at electronic supply houses such as "Digi-key" or constructed with encoder disks (not shown in FIG. 3), LED emitters (not shown in FIG. 3), and photo detectors (not shown in FIG. 3). These are basic components of a common computer mouse (not shown in FIG. 3).

Figure 4:
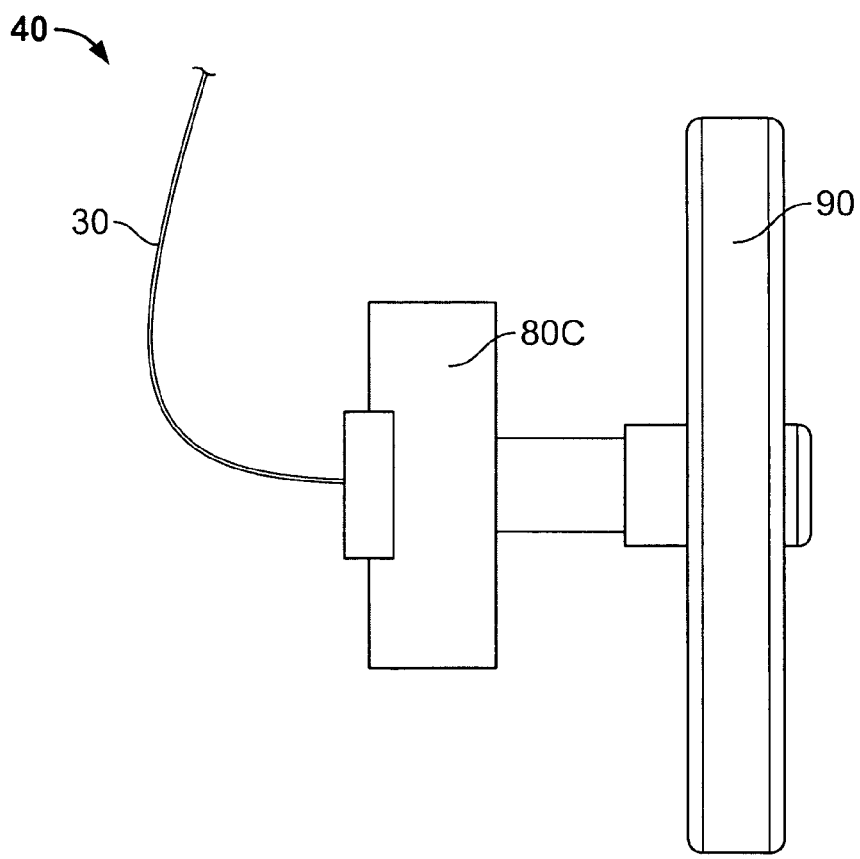
FIG. 4 is a diagram of Y-axis encoder motion detection assembly in accordance with one embodiment of the present invention.

Turning now to FIG. 4, a diagram of a Y-axis encoder motion detection assembly in accordance with one embodiment of the present invention is presented. The Y-axis contact wheel 90 can be made with rubber or any material having traction sufficient for rotating the encoder shaft according to the movement of the exercise equipment, and is secured to the encoder shaft (not shown in FIG. 4) of the Y-axis encoder 80c in order to transfer movement data. Connection means 30 connects the Y-axis encoder to the controller 100. The encoder shaft can also be fixed to any rotating axis of any exercise device (not shown in FIG. 4). Detection of the movement of the exercise device can be acquired through other means such as: optical (not shown in FIG. 4), (optical mouse) analogue transducer, and possibly laser, or other light displacement beam mechanisms.

Figure 5:
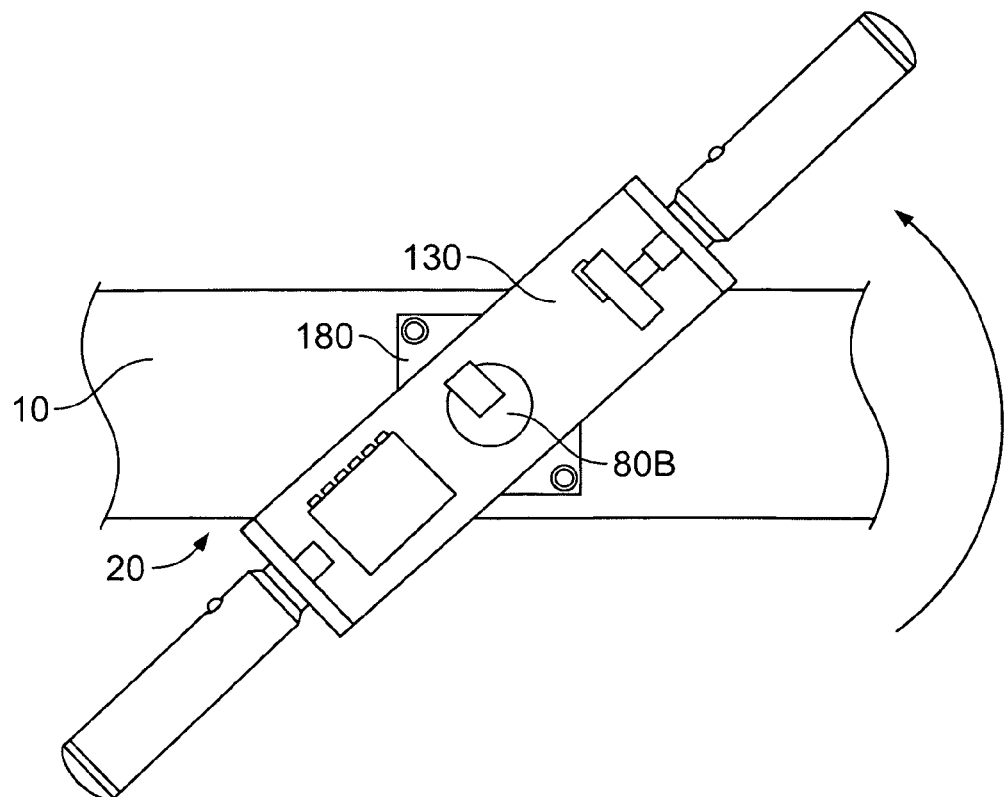
FIG. 5 is a top view of a controller in a left-turn position in accordance with one embodiment of the present invention.

Turning now to FIG. 5, a top view of a controller in a left-turn position in accordance with one embodiment of the present invention is presented. As the user turns the controller 20, steering mount 180 remains stationary, as does the shaft of X-axis rotary encoder 80b. Thus the X-axis rotary encoder 80b detects the rotating movement, being attached to the controller 20 itself.

Figure 6:
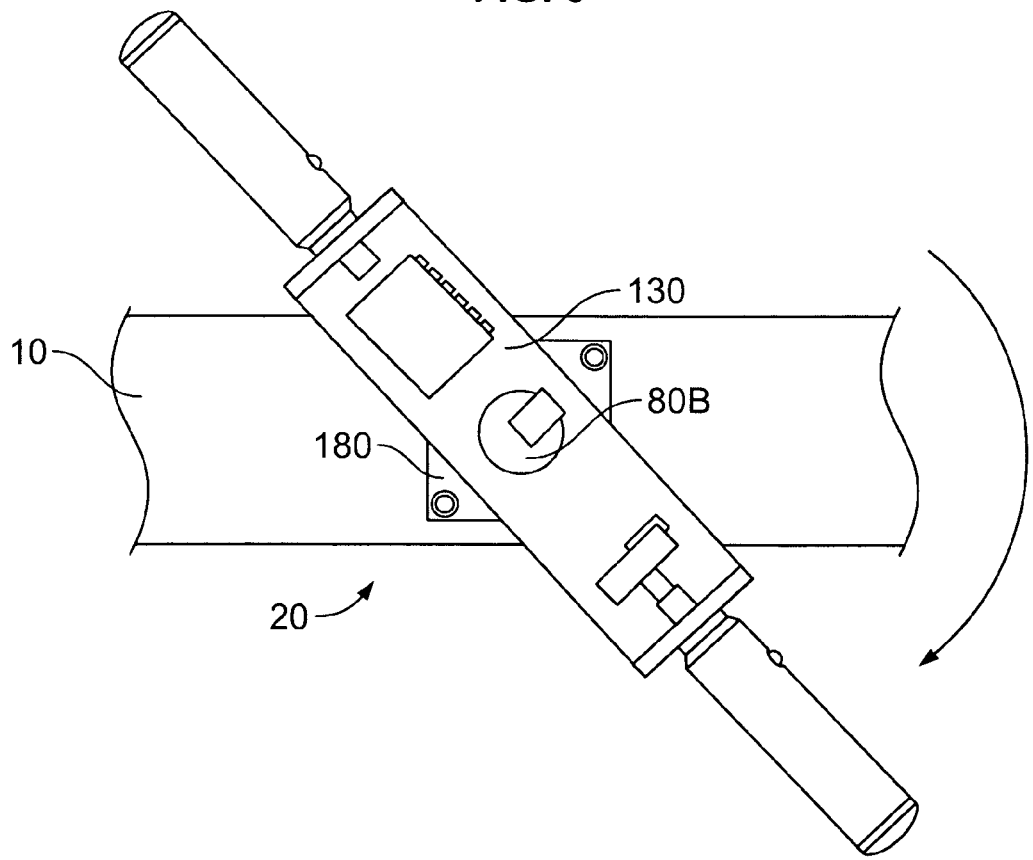
FIG. 6 is a top view of a controller in a right-turn position in accordance with one embodiment of the present invention.

Turning now to FIG. 6, a detailed top view of a controller in a right-turn position in accordance with one embodiment of the present invention is presented. As the user turns the controller 20, steering mount 180 remains stationary, as does the shaft of X-axis rotary encoder 80b. Thus the X-axis rotary encoder 80b detects the rotating movement, being attached to the controller 20 itself.

Figure 7:
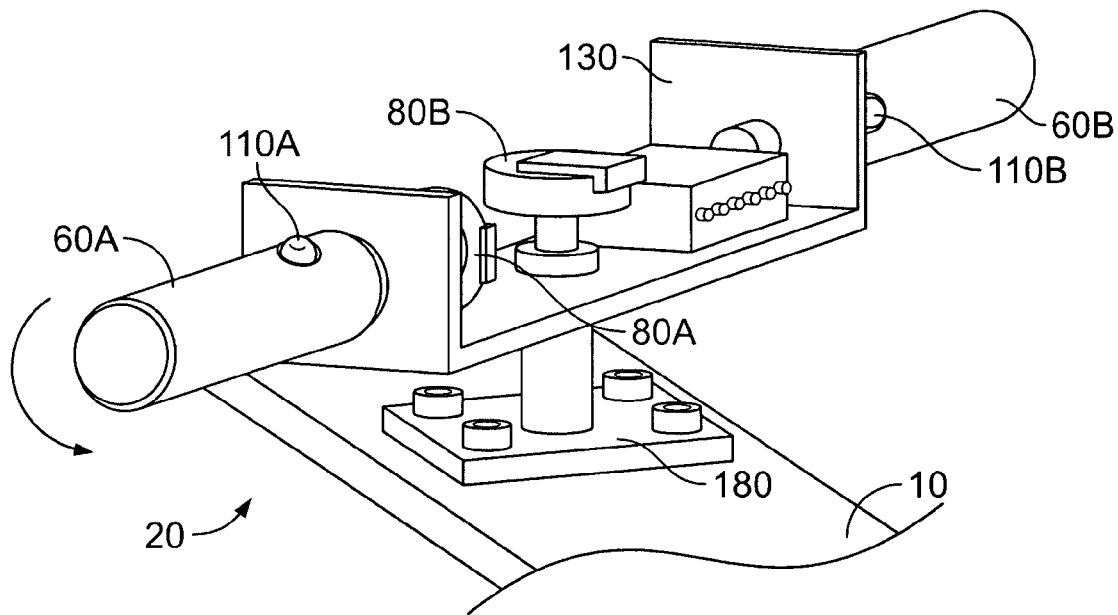
FIG. 7 is a top front view of a controller showing a Z-axis handle in the upward rotation position in accordance with one embodiment of the present invention.

Turning now to FIG. 7, a detailed front angled view of the controller 20 with right handle 60a in the upward rotation position, is presented. The encoder shaft (not shown in FIG. 7) of Z-axis encoder 80a is attached to the right handle 60a and the left handle 60b, rotates with the handle while Z-axis encoder 80a remains stationary and thus detects the rotation.

Figure 8:
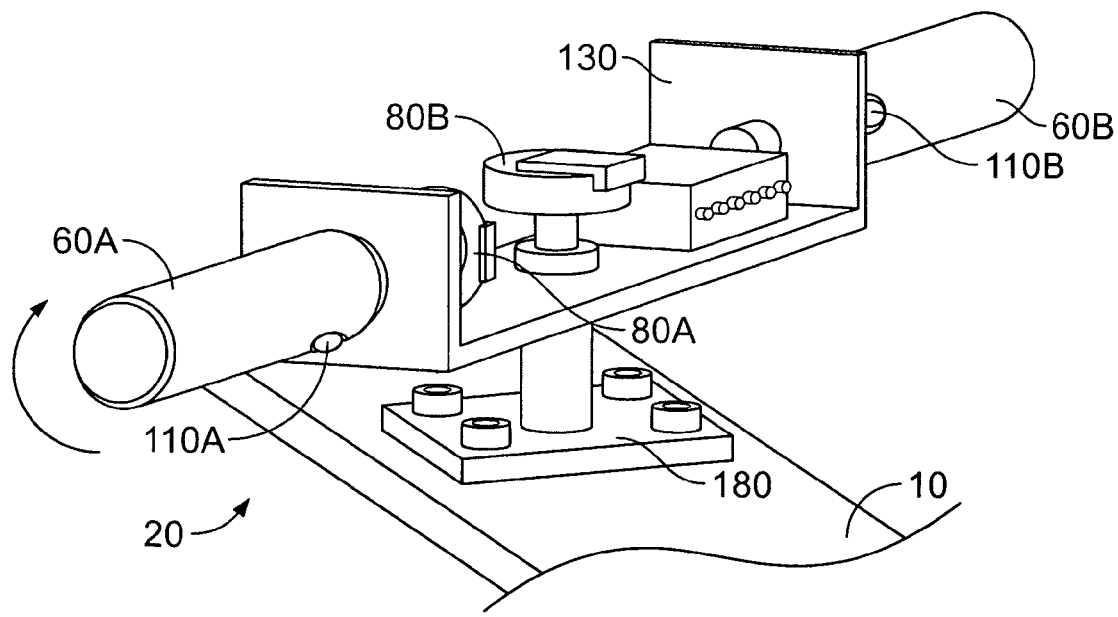
FIG. 8 is a top front view of a controller showing a Z-axis handle in a downward rotation position in accordance with one embodiment of the present invention.

Turning now to FIG. 8, a top front view of a controller 20 showing a Z-axis handle in a downward rotation position in accordance with one embodiment of the present invention, is presented. The encoder shaft (not shown in FIG. 8) of Z-axis encoder 80a is attached to the right handle 60a and the left handle 60b, rotates with the handle while Z-axis encoder 80a remains stationary and thus detects the rotation.

Figure 9:
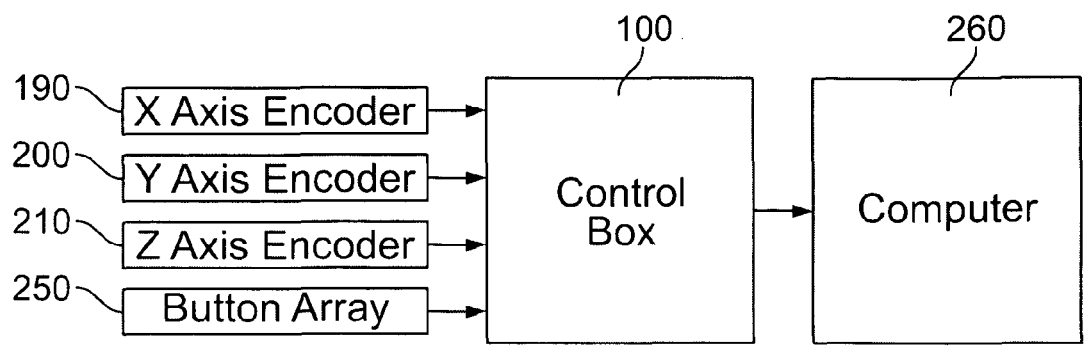
FIG. 9 is a flow chart detailing the flow of information through main components of a system in accordance with one embodiment of the present invention.

Turning now to FIG. 9, a flow chart detailing the flow of information through main components of a system in accordance with one embodiment of the present invention, is presented. Signal 190 is a signal generated by X-axis encoder 80b. Signal 200 is generated by the Y-axis encoder 80c. Signal 210 is generated by the Z-axis encoder 80a. Signal 250 is generated by control button or button 110a, control button 110b, or both. Reference numeral 100 represents the controller. Reference numeral 260 represents a common computer or other gaming support device. Controller 100 is configured to receive signal 190, signal 200, signal 210, and signal 250, and process those signals as described below with reference to FIG. 11. More specifically, controller 100 comprises a re-centerer configured to re-center one or more axis of movement, and a ratio processor configured to interpret, transmit, and adjust one or more ratios for speed and other axis of movement.

Figure 10:
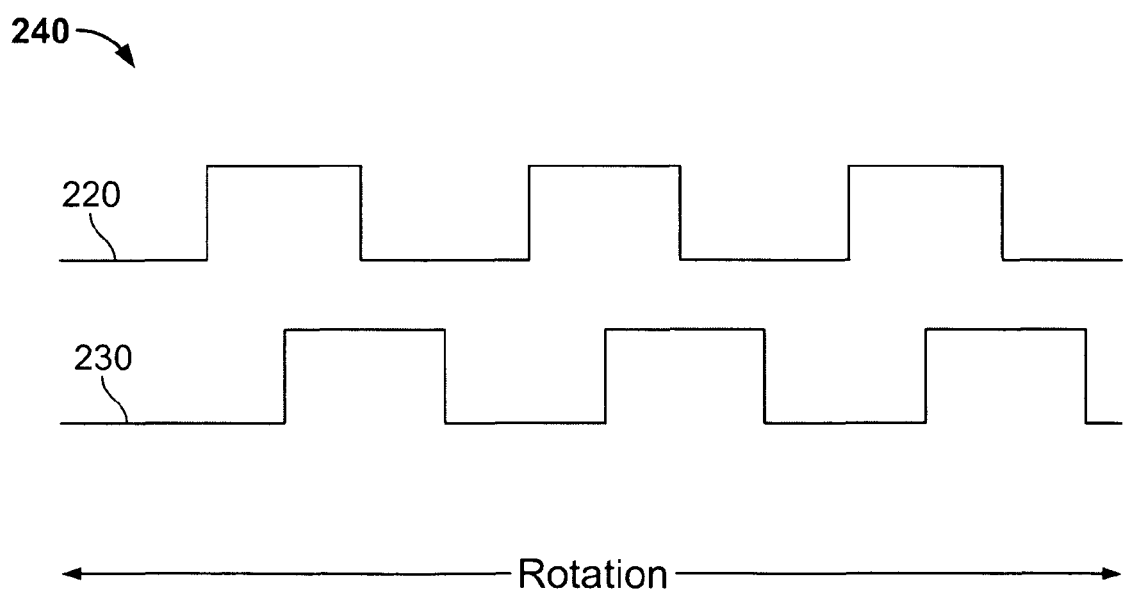
FIG. 10 is a description of a quadrature signal from encoders in accordance with one embodiment of the present invention.

Turning now to FIG. 10, a description of a quadrature signal from encoders in accordance with one embodiment of the present invention is presented. Signal 240 is the quadrature signal generated by Z-axis encoder 80a, X-axis encoder 80b, and Y-axis encoder 80c. Reference numeral 220 represents the A-channel of the quadrature output from the Z-axis encoder 80a, X-axis encoder 80b, and the Y-axis encoder 80c. Reference numeral 230 is the B-channel of the quadrature output from the encoders 80a, 80b, and 80c.

Figure 11:
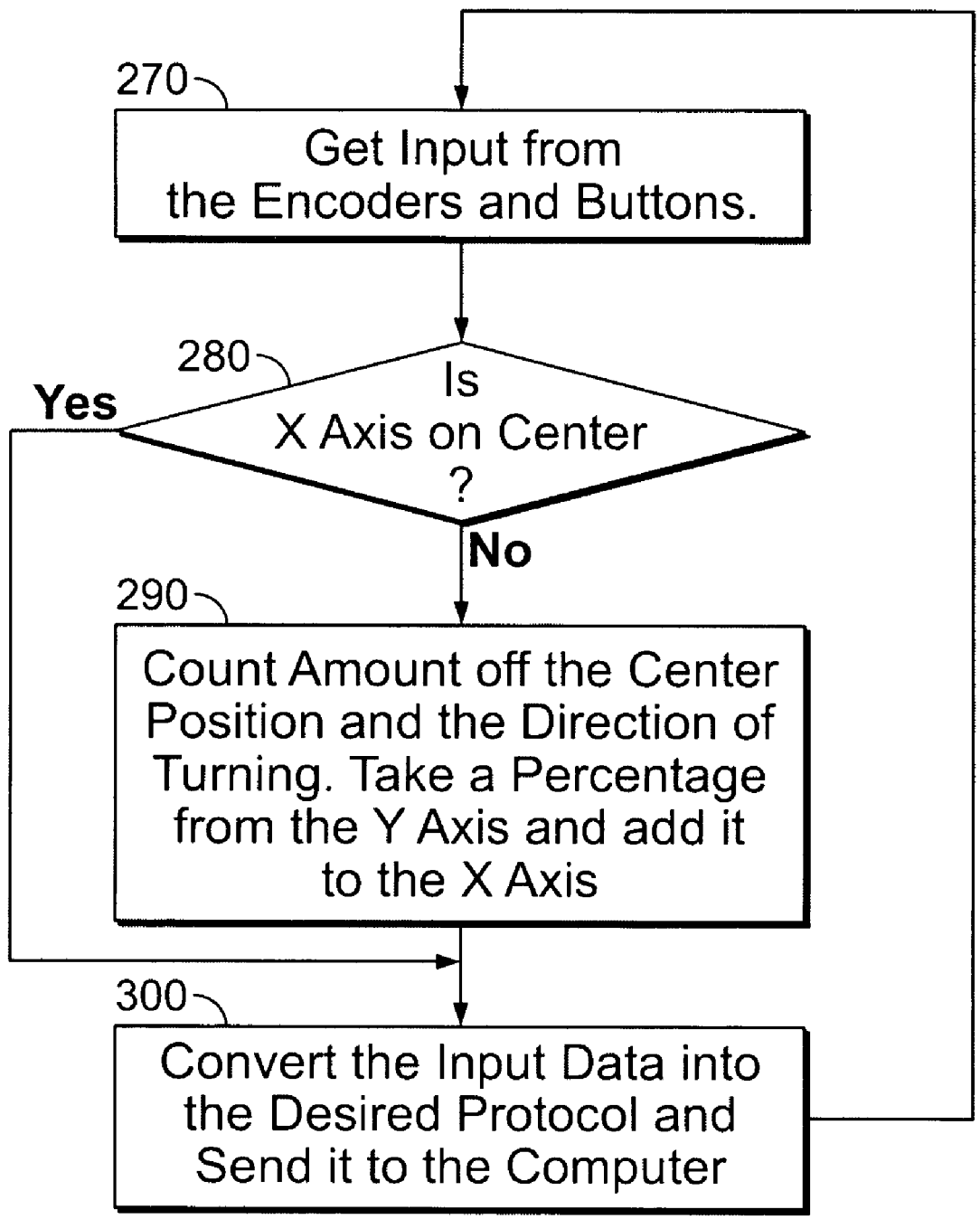
FIG. 11 is a flowchart illustrating a method for processing input through a controller in accordance with one embodiment of the present invention.

Turning now to FIG. 11, a flowchart illustrating a method for processing input through a controller in accordance with one embodiment of the present invention is presented. At 270, input from one or more encoders or buttons is obtained. At 280, a determination is made regarding the position of the steering device. If at 280 it is determined that the X axis is off-center, at 290 the data acquired at 270 is modified based at least in part upon the position of the steering. The further off-center the steering device is, the higher the percentage of Y-axis 200 data that is added to the X-axis 190 data. According to one embodiment of the present invention, this can be determined using the algorithm below as follows:

DEFINITIONS

| Variable | Definition |
| --- | --- |
| x_rate | The pulse rate of the x-axis encoder |
| y_rate | The pulse rate of the y-axis encoder |
| x_angle | Position of handlebars in degrees |

$$x\_turnrate = \sqrt{90 - |x\_angle|} * y\_rate.$$

A larger x_rate equals a slower turn speed.

$$x\_rate_{(new)} = \frac{x\_rate_{(old)} * x\_turnrate}{x\_rate_{(old)} + x\_turnrate}$$

Both wavelengths combined produce a "faster" shorter wavelength representing the combined speeds of forward movement and turning through a computer gaming or training program.

Still referring to FIG. 11, at 300 the final computed input signal data is converted into the desired protocol to send to a computer 260. Example protocols are USB, PS/2, and RS-232, with standard mouse drivers (not shown) in standard operating systems, e.g. Microsoft Windows operating systems, Apple Macintosh operating systems, DOS, etc.

The above explanation provides an example of a means for creating a turning effect that re-centers the steering view, in a computer gaming or training program, as the user (not shown) moves in a different direction, mimicking the natural feel of turning a car or bicycle while in motion. This also allows for a precise aim inside of a computer gaming or training program. Device driver software could also be written for special applications or modifications to the invention.

Anyone skilled in the art of writing human interface software would be capable of updating or re-writing drivers to accommodate alternate methods of achieving the desired effects outlined in this invention.

Operation

In operation, the steering device is used for turning through the program or game, and handles much like the turning effect experienced while operating a car or riding a bicycle, as it will re-center as the user comes out of the turn and/or begins to change direction. A user may use a stationary exercise device meant for leg movement, to move forward through the virtual reality program, such as a virtual reality gaming program or a virtual reality training program. The handle of the controller can be twisted for up and down looking or for movements. According to one embodiment of the present invention, one or more buttons and switches are configured for additional controls according to computer gaming or training program requirements. The controller or the steering device may also be a mounting site for additional buttons and controls. An electric ratio adjustment, or gearing switch, knob or button can also be finger accessible. Additionally, many games and training programs have user adjustments available for altering ratio and or signal sensitivity.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A manifold compatibility human interface system, comprising:
   a. a processor coupled to a multi-axis rotational motion device comprising a handle bar, wherein said processor is configured to process signals generated from said multi-axis rotational motion device to create values usefully readable in a computer generated 3D environment as expressed with the following algorithmic logic:

$$x\_turnrate = \sqrt{90 - |x\_angle|} * y\_rate$$

$$x\_rate_{(new)} = \frac{x\_rate_{(old)} * x\_turnrate}{x\_rate_{(old)} + x\_turnrate}$$

wherein x_rate is a pulse rate of an x-axis encoder, wherein the x-axis encoder measures the pulse rate of the multi-axis rotational motion device;
   y_rate is a pulse rate of a y-axis encoder, wherein the y-axis encoder measures the pulse rate of a mean for locomotion on a stationary fitness device;
   x_angle is a position of the handlebar in degrees;
   a larger x_rate equals a slower turn speed;
   b. said processor communicably coupled with the stationary fitness device including the multi-axis rotational motion device, wherein said stationary fitness device is configured to produce two or more axis of rotational output signals and said stationary fitness device comprises a mean for transmission of said output signals to said processor;
   c. said processor consequently re-centers a user's perspective within the computer generated 3D environment along one or more axis of directional movement when the user continues motion along another true rotational axis of said multi-axis rotational motion device;
   d. one or more controls on the stationary fitness device configured for reversing and/or transverse of said output signals along said one or more axis of directional movement;

e. an array of key function buttons operatively located within reach of the user's fingers during operation of said multi-axis rotational motion device;

f. a mean for transmitting signals from said processor to a computer, allowing the user to move his legs as a mean of locomotion within the computer generated 3D environment, while also steering and otherwise freely and interactively navigating throughout all axis of movement within the computer generated 3D environment with real time perception of the user's movement accurately reflected within the computer generated 3D environment.

* * * * *